United States Patent [19]
Yu et al.

[11] Patent Number: 5,912,399
[45] Date of Patent: Jun. 15, 1999

[54] CHEMICAL SYNTHESIS OF REFRACTORY METAL BASED COMPOSITE POWDERS

[75] Inventors: Chunzhe C. Yu, Painted Post, N.Y.; Reshma Kumar, Kensington, Md.

[73] Assignee: Materials Modification Inc., Fairfax, Va.

[21] Appl. No.: 08/751,017

[22] Filed: Nov. 14, 1996

Related U.S. Application Data

[60] Provisional application No. 60/006,805, Nov. 15, 1995.

[51] Int. Cl.$^6$ ........................................................ B22F 9/24
[52] U.S. Cl. ................................ 75/351; 75/363; 75/369; 75/623; 148/217; 148/218; 148/238; 423/61; 423/440
[58] Field of Search .................................. 148/217, 237, 148/238; 75/351, 363, 367, 369, 623; 423/53, 61, 440

[56] References Cited

U.S. PATENT DOCUMENTS

| | | | |
|---|---|---|---|
| 3,013,875 | 12/1961 | Triffleman | 148/237 |
| 3,488,291 | 1/1970 | Hardy et al. | 252/301.1 |
| 3,685,134 | 8/1972 | Blue | 29/420.5 |
| 4,115,526 | 9/1978 | Auborn et al. | 745/623 |
| 4,788,627 | 11/1988 | Ehlert et al. | 361/386 |
| 5,086,333 | 2/1992 | Osada et al. | 357/67 |
| 5,352,269 | 10/1994 | McCandlish et al. | 75/351 |
| 5,413,751 | 5/1995 | Polese etal. | 419/23 |
| 5,441,553 | 8/1995 | Polizzotti et al. | 75/230 |
| 5,451,557 | 9/1995 | Sherif | 423/440 |
| 5,580,397 | 12/1996 | Meyer et al. | 148/238 |

OTHER PUBLICATIONS

A.K. Bhalla et al. Powder Metallurgy, "A Comparative Assessment of Explosive and Other Methods of Compaction in the Production of Tungsten–Copper Composites", 1976, No. 1, pp. 31–37.

C. Lea, et al., Metallurgical Transactions A, "Segregation to Interphase Boundaries in Liquid–Phase Sintered Tungsten Alloys", vol. 14A, Apr. 1983, pp. 667–677.

N.C. Kothari, Powder Metallurgy International, "Factors Affecting Tungsten–Copper and Tungsten–Silver Electrical Contact Materials", vol. 14, No. 3, 1982, pp. 139–159.

Jerry Wittenauer et al., Tungsten and Tungsten Alloys—Recent Advances, "Fine–Grained W–Cu–Co Alloys via Liquid Phase Sintering", pp. 21–26.

Brian E. Williams et al., Tungsten and Tungsten Alloys—Recent Advances, "CVD Coated Tungsten Powder Composites, Part I: Powder Processing and Characterization", pp. 95–101, 1991.

John L. Johnson et al., The International Journal of Powder Metallurgy, "Chemically Activated Liquid Phase Sintering of Tungsten–Copper" vol. 30, No. 1, pp. 91–102.

Randall M. German et al., The International Journal of Powder Metallurgy, "Powder Metallurgy Processing of Thermal Management Materials for Microelectronic Applications", vol. 30, No. 2, pp. 205–215.

Schulze, K. et al., "High–Temperature Interactions of Refractory Metals with Gases," *Journal of Metals*, Oct. 1988, pp. 25–31.

*Primary Examiner*—George Wyszomierski
*Attorney, Agent, or Firm*—Finnegan, Henderson, Farabow, Garrett & Dunner, L.L.P.

[57] ABSTRACT

A new tungsten compound is formed by reacting ammonium metatungstate with guanidine carbonate. Such a compound can be converted to metallic tungsten, tungsten carbide or oxycarbide, and tungsten nitride or oxynitride. One can also make multiphase composite particles based on molybdenum, tungsten or their compounds (such as carbide or nitride), and at least one other metallic phase, such as cobalt, copper, nickel, iron or silver. The process involves first dispersing particles of a refractory metal or its compounds in a liquid medium, followed by inducing a chemical reaction in the liquid phase to generate a new solid phase which coats or mixes with the dispersed particles. The solid phase includes elements required in the final composite. After removing the liquid phase, the remaining solid is converted by hydrogen reduction into the final products.

22 Claims, No Drawings

CHEMICAL SYNTHESIS OF REFRACTORY METAL BASED COMPOSITE POWDERS

This application claims benefit of Provisional Application No. 60/006,805 filed Nov. 15, 1995.

BACKGROUND OF THE INVENTION

1. Field of the Invention

This invention relates to refractory based materials, particularly to tungsten powders and refractory metal based composite particles.

2. Description of the Related Art

Two of the more common refractory metal based bulk composites include molybdenum and tungsten. These bulk composite materials of Mo, W or compounds of these metals are strengthened by the presence of other compounds (such as carbides, borides and nitrides). These bulk composites possess a unique combination of characteristics such as high strength, toughness, electrical and thermal conductivity, tailored thermal expansion coefficient, excellent high temperature strength and good wear/corrosion/erosion resistance. They have a wide range of applications in high-temperature high-strength services in advanced nuclear reactors, power plants, rocket propulsion and space power systems, superconducting devices, radiation shielding (from gamma rays and hard x-rays), vibration damping devices, heavy duty electrical contacts, thermal management substrates, a variety of relays, high voltage switches and oil cooled circuit breakers, counterweights, boring bars, semiconductor substrates, rotational gyroscope members in inertial guidance systems, shaped charge liner materials, and other military applications such as kinetic energy projectiles.

A number of disclosures of Mo and W based bulk composites, such as WC—Co, Mo—Cu, W—Cu, Mo—Ag, W—Ag, Mo—Ni, W—Ni, W—Cu—Ni, W—Fe—Ni, and W—Ni—Co exist in the literature. As used herein, a bulk composite is a mixture or mechanical combination on a macro scale of two or more materials that are solid in the finished state, are mutually insoluble, and differ in chemical nature. Various processes have been used for making these materials, including powder metallurgical conversion, infiltration, liquid phase sintering, mechanical alloying, fluidized bed CVD coating processes, thermo-chemical processes, and spray conversion processes.

A conventional powder metallurgical conversion process used to produce WC—Co includes the following steps:

a) reducing tungsten oxide, tungstic acid, ammonium meta-tungstate or ammonium para-tungstate to tungsten metal with hydrogen;

b) mixing the metallic tungsten powder and carbon black;

c) heating mixed tungsten and carbon in vacuum at 1350–1600° C. to form coarse WC powder;

d) refining the coarse WC powder, by such means as ball milling, high energy vibratory milling or attrition milling, to form a refined WC powder with desired particle size distribution;

e) coating the refined WC with Co by ball milling WC with coarse metallic cobalt.

Since the process described above involves different stages such as blending, solid state reaction, crushing and grinding, the production cycle is long, the capital investment in machinery is high, and the final powder normally has a diameter above 2 to 3 microns. Various problems are encountered both in the WC synthesis and the mixing with Co. Specifically, kinetic limitations in the WC synthesis require processing at high temperature for long periods of time. In addition, compositional control is impaired by the introduction of impurities during the mechanical processing of the composite powders, primarily during the required milling operation. Moreover, the long time necessary for achieving the desired microstructure and homogenization during milling adds significantly to the overall processing costs. Finally, a uniform distribution of WC in the Co matrix is difficult to achieve.

There are several other methods for making tungsten or molybdenum bulk composites: infiltration, mechanical alloying and liquid phase sintering. The infiltration technique includes pre-sintering tungsten or molybdenum powder into a porous skeleton followed by infiltrating the skeleton with molten metallic copper, silver, gold or nickel to produce bulk composites of W—Cu, W—Ag, W—Au, W—Ni, Mo—Cu, Mo—Ag, Mo—Au and Mo—Ni.

The mechanical alloying technique involves ball milling and consolidating a mixture of tungsten (or molybdenum) powder and other ductile metallic powders (such as copper, silver, gold and nickel). The mechanically alloyed W—Cu composite, for example, normally exhibits a microstructure consisting of heavily cold-worked W platelets separated by thin Cu films.

The liquid phase sintering technique consists of first cold pressing mixture of tungsten (or molybdenum) powder and other ductile metallic powders (such as copper, silver, gold and nickel) into a pre-compact. The cold pressed compact is then heat treated to temperatures above the melting point of the ductile metal phase. During the process, rearrangement of tungsten (or molybdenum) particles occurs in the liquid phase matrix. Between tungsten and copper, there is no mutual solubility in either the solid or liquid state. For making high tungsten content (W above 80 wt %) W—Cu composite, a small amount (less than 1 wt %) of Co, Fe or Ni, is frequently added to enhance the sinterability of the W—Cu system. In W—Ni, W—Fe—Ni and W—Ni—Co systems, in contrast to the pure W—Cu system, tungsten partially dissolves in the matrix during liquid phase sintering. The process may be divided into three stages: the rearrangement, solution-reprecipitation and solid-state controlled stages. The resulting bulk composite alloys normally consist of nearly pure tungsten grains dispersed in a ductile matrix.

The biggest drawback of the conventional synthesis approaches (infiltration, mechanical alloying and liquid phase sintering) for making W- or Mo-composites is the lack of compositional homogeneity in the end products. Segregation of ductile metal phase (Cu, Ag, Au and Ni) and W or Mo phase is routinely observed, resulting in inadequate local homogeneity of thermal and electrical conductivities. Furthermore, these composites exhibit porosity and impurity effects that create deleterious effects on the thermal/ electrical conductivity and the machinability of the final sintered products.

In contrast to a bulk composite, which may be made by consolidating discreet matrix material powders and strengthening phase powders, a composite particle or powder is a particle of at least two materials, each insoluble in the other. Composite particles or powders may exist as multiple component particles adhered to each other (typically, one material will be present as several smaller particles adhering to a much larger particle of the other material), discreet, intermixed phases, or a coating of a first material on a second material core. W—Ni, W—Fe—Ni and W—Ni—Co composite powders have been produced by a chemical vapor deposition process in which the tungsten powder was suspended within a gas stream containing precursors of iron, nickel and/or cobalt inside a fluidized bed reactor. The gaseous precursors decomposed inside the reaction chamber with subsequent condensation from the vapor state to form a deposit of Fe, Ni and/or Co on the individual W particle surfaces. These composite powders may then be consolidated by known powder metallurgy techniques to form bulk composite materials.

The fluidized bed-CVD approach can produce composite powders with well coated individual particles capable of being processed into final products with high compositional homogeneity. However, the scale up of such fluidized bed-CVD process is difficult. In addition, it is difficult to process sub-micron size W or Mo powders by this technology.

U.S. Pat. No. 5,441,553 discloses a thermo-chemical process for producing WC—Co powders. The process includes first synthesizing $Co(en)_3WO_4$ (en= ethylenediamene), a compound of defined composition with Co:W atomic ratio of 1:1, followed by reductive decomposition of $Co(en)_3WO_4$ powder under hydrogen at about 650° C. to form W—Co powder. The W—Co powder is finally converted to WC—Co by reacting the powder with a $CO/CO_2$ gas mixture at temperatures between 700–1000° C. This process, however, is limited in its ability to produce WC—Co composite materials of varying compositions.

U.S. Pat. Nos. 3,488,291 and 5,352,269 disclose a spray conversion process which can produce WC—Co powder with 3–23 % by weight cobalt. The typical process includes the following steps.

1. Preparing a starting solution of a soluble cobalt salt and a tungsten containing salt.
2. Spray drying the starting solution into dry powder
3. First reacting the dried powder with CO, $CO/CO_2$ or $CH_4/H_2$ gas mixtures that have a carbon activity equal to or greater than 1.0, in a fluidized bed reactor.

Then removing extra free carbon deposit by gasification using CO, $CO/CO_2$ or $CH_4/H_2$ gas mixtures that have a carbon activity less than 1.0.

The powders produced by this spray conversion process have diameters between 10 to 50 microns, and have much smaller crystallites in the submicron (~0.1 μm) size range.

SUMMARY OF THE INVENTION

Accordingly, the present invention is directed to an improved method of making refractory based composite materials. Specifically, the invention is directed to a method of making a tungsten-based material by reacting ammonium metatungstate and guanidine carbonate to precipitate a tungsten containing compound.

Another aspect of the invention is drawn to a method of making a refractory metal-based composite particle by dispersing a refractory metal based material in a liquid medium containing an element, causing the liquid medium to react to generate a solid phase containing the element, the solid phase combining with the refractory metal based material, and reducing the solid phase and refractory metal based material to form the refractory metal-based composite particle containing the refractory metal and the element.

It is to be understood that both the foregoing general description and the following detailed description are exemplary and explanatory, and are not restrictive of the invention as claimed.

DETAILED DESCRIPTION OF THE PREFERRED EMBODIMENT

The present invention relates to a new approach for synthesizing tungsten and molybdenum based materials.

There are two aspects associated with the invention. The first aspect relates to forming a tungsten containing compound by reacting ammonium metatungstate and guanidine carbonate. The resulting powder obtained can then be reduced to tungsten metal, carburized to tungsten carbide, nitrided to tungsten nitride, or processed into tungsten containing composites.

The other aspect includes coating a refractory metal compound, such as molybdenum or tungsten compounds. The compounds may be Mo or W metals, carbides, nitrides or oxides. These materials may include other desired elements introduced through a wet chemical process, followed by a gas-solid reaction to convert the coated precursor powder into the final refractory metal based composite materials. The tungsten compound to be coated in the initial stage could also be tungstic acid, ammonium meta-tungstate, ammonium paratungstate, or the compound synthesized by the method described above.

The processes of the current invention can be readily scaled up. The consolidated compacts of the composite powder made by this invention show higher homogeneity and thermal conductivity than those produced by the prior art methods.

The method of synthesizing a new tungsten containing compound includes preparing and mixing two starting solutions, an aqueous solution of ammonium metatungstate and an aqueous solution of guanidine carbonate. The concentration of either of the solutions can be varied between 0.1M to 2M. The mixing can be accomplished by adding either solution into the other, or by co-injection of both solutions into a reaction chamber.

Co-injecting both solutions into a reaction chamber minimizes local concentration inhomogeneity. Moreover, a continuous process can be developed in which on-line monitoring devices can readily monitor and/or control the process.

The reaction between ammonium metatungstate and guanidine carbonate results in a fine precipitate of a tungsten compound. The particle size of the precipitate can be controlled by varying processing parameters such as the concentration of ammonium metatungstate, the concentration of guanidine carbonate, or the procedure for mixing these two solutions. The size of the particles produced by this reaction are generally in the sub-micron range, having a size distribution approximating a normal distribution of from 0 to 100 nm. The precipitate can be separated from the liquid phase by filtration, centrifuging, or simply settling/decanting. After drying, the resulting powder can be 1. converted into tungsten powder by hydrogen reduction at 650–1100° C.,
2. converted into tungsten carbide in 10–60 vol. % $CH_4$—$H_2$ gas mixture at 700–1200° C.,
3. converted into tungsten nitride in 40–100 vol. % $NH_3$—$H_2$ or 40–100 vol. % $NH_3$—$N_2$ gas mixtures at 700–1100° C.

Alternatively, the wet precipitate can be coated with compounds containing desired elements such as cobalt, copper, nickel, iron or silver without drying. The coated powder can then be further processed through a solid-gas reaction to form tungsten based composites.

The method of synthesizing refractory metal based composite particles includes the following steps.

1. Dispersing refractory metals or their compounds, in the powder form, in a liquid medium containing soluble materials consisting of desired elements required in the final composites; or alternatively dispersing refractory metals or their compounds in a liquid medium containing a chemical which functions as precipitating agent upon addition of certain metal salt solutions.

2. Inducing chemical reaction, by heating, adding precipitating agent or other chemical reagent, to generate a new solid phase which either coats individual particles of the dispersed phase, or mixes with the dispersed phase in a highly homogeneous manner. The new solid phase contains desired elements, such as cobalt, copper, nickel, iron and silver, required in the final composites.

3. Separating the solid phase from the liquid phase, drying, then converting into the final composite powders by gas-solid reactions.

The dispersed phase can be Mo or W metals, or their compounds (such as borides, carbides, nitrides and oxides). The dispersed phase can also be molybdic acid, tungstic acid or the tungsten compound obtained by the reaction between ammonium metatungstate and guanidine carbonate. The dispersion can be achieved by mechanical agitation, by the addition of surfactants, or by a combination of the two. Due to the high density of tungsten, glycerol can be added to the liquid phase to facilitate the dispersion.

A uniform coating of the dispersed phase can be achieved by alcoholysis of acetates, or by precipitation of metal hydroxide, carbonate or other insoluble metal salts. Separating the solid from the liquid phase can be accomplished by filtration, centrifuging, or simply settling/decanting. After drying, the resulting powders are reacted with hydrogen to obtain the final composites. The elements of interest, other than the refractory metal or their compounds, include cobalt, copper, nickel, iron and silver.

A significant advantage of this method is its ability to coat sub-micron (i.e. less than 1 $\mu$m) sized particles with a second phase. Because the method uses a wet chemical process, the core particles, and therefore the composite particles, can be much smaller than those used in, and manufactured by, prior art processes. For example, the process is ideally suited for coating the particles that are less than 100 nm produced by the reaction between ammonium metatungstate and guanidine carbonate.

The present invention is further understood by reference to the examples which follow.

EXAMPLE 1

Individual solutions of ammonium metatungstate and guanidine carbonate were first prepared separately. These two solutions were then slowly mixed together under vigorous stirring. A fine precipitate was formed by the reaction between the two chemicals. The molar ratio of guanidine carbonate to ammonium metatungstate was kept between 1~3. The precipitate was separated from the liquid phase by centrifuge, then dried. The dried white powder thus obtained was reduced to metallic tungsten in hydrogen between 750–900° C.

In another example, the dried white powder obtained by the reaction of ammonium metatungstate and guanidine carbonate was carburized to WC by a 20% $CH_4$-80% $H_2$ (vol %) gas mixture at temperatures between 700–1200° C. A 1% $O_2/N_2$ gas mixture was used to passivate the WC after carburization before exposure to the air.

EXAMPLE 2

A 94WC-6Co (wt %) sample was made by first carburizing tungstic acid ($H_2WO_4$) with 20 vol. % $CH_4$—$H_2$ gas mixture between 800–875° C. After reaction, the WC was passivated in 1% $O_2/N_2$ before exposure to the air. The WC thus obtained was dispersed in guanidine carbonate solution through mechanical agitation. A solution of cobalt nitrate was then slowly added into the WC suspension with vigorous stirring. The amount of WC and cobalt used was calculated according to the final composition of 94wt % WC-6wt % Co. The molar ratio of guanidine carbonate to cobalt nitrate was between 1~2. After 15 minutes of continuous stirring, the mixture was permitted to settle. The top liquid was decanted, while the bottom solid phase was retrieved and dried. The dried powder was finally converted into WC—Co by hydrogen reduction at 800–850° C.

EXAMPLE 3

A 90W-10Cu (wt %) sample was prepared by coating tungsten powder through alcoholysis reaction followed by hydrogen reduction. A batch process included first mixing methanol (MeOH) with water at 5:1 to 20:1 volume ratio. Copper acetate was then added to the MeOH/$H_2O$ mixture heated to 50–60° C. After 0.5 hour of continuous stirring, W powder was added and the temperature increased to 100–120° C. The amount of tungsten and copper acetate added was calculated corresponding to the final composition of 90wt % W-10wt % Cu. Stirring was continued until all the liquid evaporated. The solid remaining was dried and pulverized. The coated powder thus obtained was finally converted to W—Cu at 800° C. under hydrogen atmosphere.

EXAMPLE 4

An 80W-20Cu (wt %) sample was prepared by the same process as in example 4, with the amount of W and copper acetate addition corresponding to the final composition, 80wt % W-20wt % Cu.

EXAMPLE 5

A 90W-10Cu (wt %) sample was prepared by coating commercial tungstic acid with copper carbonate followed by hydrogen reduction. The batch process included first dispersing $H_2WO_4$ in a guanidine carbonate solution through mechanical agitation. A solution of copper nitrate was then slowly added into the $H_2WO_4$ suspension with vigorous stirring. The amount of $H_2WO_4$ and copper nitrate used was calculated according to the final composition of 90 wt % W-10 wt % Cu. Molar ratio of guanidine carbonate to copper nitrate was between 1~2. After 15 minutes of continuous stirring, the mixture was permitted to settle. The top liquid was decanted, while the solid phase was retrieved and dried. The dried powder was finally converted into W—Cu by hydrogen reduction at 800–850° C.

EXAMPLE 6

An 85 W-10$TiB_2$-5Cu sample was prepared by a method similar to that described in example 5. The variation was that $TiB_2$ powder was dispersed together with $H_2WO_4$ powder. The amount of $H_2WO_4$, $TiB_2$ and copper nitrate used was calculated according to the final composition of 85wt % W-10wt % $TiB_2$-5wt % Cu. The molar ratio of guanidine carbonate to copper nitrate was also kept between 1~2.

EXAMPLE 7

A 90W-10Cu (wt %) sample was prepared by the following process. First, individual solutions of ammonium metatungstate and guanidine carbonate were slowly mixed together with vigorous stirring. Fine precipitates formed by the reaction between the two chemicals. The molar ratio of guanidine carbonate to ammonium metatungstate was kept between 1~3. A centrifuge was used to separate the precipitate from the liquid phase. After decanting the liquid, the wet precipitate was redispersed in a guanidine carbonate solution. A solution of copper nitrate was then slowly added into the suspension with rigorous stirring. The molar ratio of guanidine carbonate (used in the solution to disperse the precipitate) to copper nitrate was between 1~2. After 15 minutes of continuous stirring, the mixture was permitted to settle. The top liquid was decanted, while the bottom solid phase was retrieved and dried. The amount of ammonium metatungstate and copper nitrate used was calculated according to the final composition, 90wt % W-10wt % Cu. The dried powder was finally converted into W—Cu by hydrogen reduction at 800–850° C. A 1% $O_2/N_2$ gas mixture was used to passivate the W—Cu after hydrogen reduction before exposure to the air.

EXAMPLE 8

Thermal conductivity of a 90W-10 Cu (wt %) composite was obtained by a laser flash technique. The powder synthesis was described in Example 7. The powder was pre-compacted under a pressure between 18~50 ksi, followed by liquid phase sintering at 1400° C. in dry hydrogen for about 30 minutes. The thermal diffusivity of the sintered compact was directly measured by laser flash experiment at various temperatures. Thermal conductivity at a particular temperature was then calculated from thermal diffusivity, density and the specific heat data. The density of the compact was measured by the immersion (Archimedes) technique, and the specific heat was calculated from the specific heat of the individual elements of the compact. Table 1 shows the superior thermal conductivity of the new W—Cu composite over the comparative examples which were made by the infiltration technique.

TABLE 1

Thermal Conductivity (W/mK)) of 90W-10Cu (wt %) compacts

|  | Room Temp. | ~200° C. | ~440° C. |
|---|---|---|---|
| Example 8 | ~220 | ~206 | ~172 |
| Comp. Example 1* | ~194 | ~177 | ~160 |
| Comp. Example 2* | ~170 | ~163 | ~151 |

*Spectra-Mat, Inc., CA.

The thermal expansion coefficient of the liquid phase sintered 90W-10Cu (wt %) composites described in Example 8 was measured using a push-rod dilatometer. Table 2 lists the coefficient of thermal expansion (CTE) values of the 90W-10Cu (wt %) compacts described in Example 8 at three different temperatures. It can be seen that the new W—Cu sample made by this invention and the corresponding comparative examples have the same coefficient of thermal expansion. Therefore, the bulk composites produced from the composite powders of this invention can readily replace conventional bulk composites where a higher thermal conductivity is desirable, but systems are designed based on the thermal expansion co-efficient of the original composite material (e.g., thermal management substrates).

TABLE 2

CTE (ppm/° C.) of 90W-10Cu (wt %) compacts

|  | 0° C. | 100° C. | 400° C. |
|---|---|---|---|
| Example 8 | 10.65 | 9.75 | 8.50 |
| Comp. Example* | 10.70 | 9.75 | 8.50 |

*Spectra-Mat, Inc., CA.

EXAMPLE 9

An 85W-10$TiB_2$-5Cu sample was prepared by a method similar to that described in Example 7. The variation was that $TiB_2$ powder was initially dispersed in ammonium metatungstate solution, with mechanical agitation, before mixing with guanidine carbonate solution. The amount of $TiB_2$, ammonium metatungstate and copper nitrate used was calculated according to the final composition, 85 wt % W-10 wt % $TiB_2$-5 wt % Cu.

EXAMPLE 10

A 85 Mo-15 Cu (wt %) sample was prepared by coating commercially available molybdenum metal powder with copper carbonate followed by hydrogen reduction. The batch process included first dispersing Mo powder in a guanidine carbonate solution through mechanical agitation. A solution of copper nitrate was then slowly added into the Mo suspension with rigorous stirring. The amount of Mo and copper nitrate used was calculated according to the final composition of 85 wt % Mo-15 wt % Cu. Molar ratio of guanidine carbonate to copper nitrate was between 1~2. After 15~30 minutes of continuous stirring, the mixture was permitted to settle. The top liquid was decanted, while the solid phase was retrieved and dried. The dried powder was finally converted into Mo—Cu by hydrogen reduction at 800–850° C.

Thermal conductivity of the 85 Mo-15Cu (wt %) composite described in Example 10 was also measured by the laser flash technique. The sample preparation and the details of the experimental procedure were the same as in Example 8. Table 3 shows the superior thermal conductivity of the new Mo—Cu composite over those of the comparative examples produced by the infiltration technique.

TABLE 3

Thermal Conductivity (W/mK)) of 85Mo-15Cu (wt %) compacts

|  | Room Temp. | ~200° C. | ~410° C. |
|---|---|---|---|
| Example 10 | ~195 | ~168 | ~172 |
| Comp. Example 1* | ~156 | ~146 | ~160 |
| Comp. Example 2* | ~156 | ~146 | ~151 |

*Spectra-Mat, Inc., CA.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only. The scope of the invention shall be determined by the appended claims and their equivalents.

What is claimed is:

1. A method of making a tungsten-based material, said method comprising:

reacting ammonium metatungstate and guanidine carbonate to precipitate a tungsten containing compounds;

dispersing said tungsten containing compound in a liquid medium containing an element;

causing the liquid medium to react to generate a solid phase containing said element, said solid phase combining with the tungsten containing compound; and reducing said solid phase and tungsten containing compound to form a tungsten-based composite particle containing tungsten and said element.

2. The method of claim 1, further comprising, reducing said tungsten containing compound to form metallic tungsten.

3. The method of claim 1, further comprising, carburizing said tungsten containing compound to form tungsten carbide.

4. The method of claim 1, further comprising, carburizing said tungsten containing compound to form tungsten oxycarbide.

5. The method of claim 1, further comprising, nitriding said tungsten containing compound to form tungsten nitride.

6. The method of claim 1, further comprising, nitriding said tungsten containing compound to form tungsten oxynitride.

7. The method of claim 2, further comprising, dispersing said metallic tungsten in a liquid medium containing an element;

causing the liquid medium to react to generate a solid phase containing said element, said solid phase combining with the metallic tungsten; and reducing said solid phase and metallic tungsten to form a tungsten-based composite particle containing tungsten and said element.

8. The method of claim 1, wherein, said element is selected from the group consisting of cobalt, copper, nickel, iron, silver.

9. The method of claim 1, wherein, after said solid phase combines with the tungsten containing compound, said tungsten containing compound is coated with said solid phase.

10. The method of claim 9, wherein said solid phase comprises copper.

11. The method of claim 10, wherein said copper coated tungsten based composite particle further includes nickel.

12. The method of claim 1, wherein, after said solid phase combines with the tungsten containing compound, said solid phase is homogeneously mixed with said tungsten containing compound.

13. The method of claim 1, including converting said tungsten containing compound to form tungsten boride.

14. The method of claim 1, wherein said tungsten based composite particle is W—Cu.

15. The method of claim 14, wherein said tungsten based composite particle further includes nickel.

16. The method of claim 1, wherein said tungsten based composite particle is WC—Co.

17. The method of claim 16, wherein said tungsten based composite particle is smaller than 100 nm.

18. The method of claim 1, wherein said tungsten based composite particle is smaller than 100 nm.

19. The method of claim 1, wherein said tungsten containing compound is a particle smaller than 100 nm.

20. The method of claim 1, wherein said element is copper.

21. The method of claim 20, wherein said tungsten based composite particle is W—Cu.

22. The method of claim 21, wherein said tungsten based composite particle further includes nickel.

\* \* \* \* \*